United States Patent [19]
Liptak et al.

[11] 3,976,901
[45] Aug. 24, 1976

[54] WINDING SLOT CLOSURE FOR ROTARY ELECTRIC MACHINES

[75] Inventors: Gabor Liptak; Roland Schuler, both of Wettingen, Switzerland

[73] Assignee: BBC Brown Boveri & Company Limited, Baden, Switzerland

[22] Filed: Oct. 30, 1974

[21] Appl. No.: 519,337

[30] Foreign Application Priority Data
Nov. 5, 1973  Switzerland.................... 15441/73

[52] U.S. Cl................................. 310/214; 310/215
[51] Int. Cl.² ......................................... H02K 3/48
[58] Field of Search ........... 310/214, 215, 217, 218, 310/213, 216, 254, 258, 259, 261, 264, 269; 336/198, 199

[56] References Cited
UNITED STATES PATENTS

| | | | |
|---|---|---|---|
| 1,555,065 | 9/1925 | Lindquist | 310/214 |
| 2,922,058 | 1/1960 | Bacon | 310/214 |
| 3,119,033 | 1/1964 | Horsley | 310/214 |
| 3,243,622 | 3/1966 | Whittlessey | 310/214 |
| 3,594,597 | 7/1971 | Kildishev | 310/214 |
| 3,780,325 | 12/1973 | Frankenhauser | 310/214 |

FOREIGN PATENTS OR APPLICATIONS

| | | | |
|---|---|---|---|
| 2,123,520 | 11/1952 | Germany | 310/214 |
| 875,360 | 8/1961 | United Kingdom | 310/214 |

*Primary Examiner*—R. Skudy
*Attorney, Agent, or Firm*—Pierce, Scheffler & Parker

[57] ABSTRACT

A rotary electrical machine is provided with a laminated stack of iron sheets in which slots are formed and winding conductors inserted therein, the entrances to the slots then being closed by insertion of slot keys along the slots. In order to maintain the winding conductors in each slot under compression and to apply a pressure against the slot keys, a row of ring-shaped disk springs in the form of a truncated cone and made from a glass fiber-reinforced synthetic resin is inserted in the slot between the slot key and the winding conductors prior to installation of the slot key. The diameter D of the truncated conical springs is made equal to the width of the slot and the central opening therein has a maximum diameter of 0.3 D.

4 Claims, 3 Drawing Figures

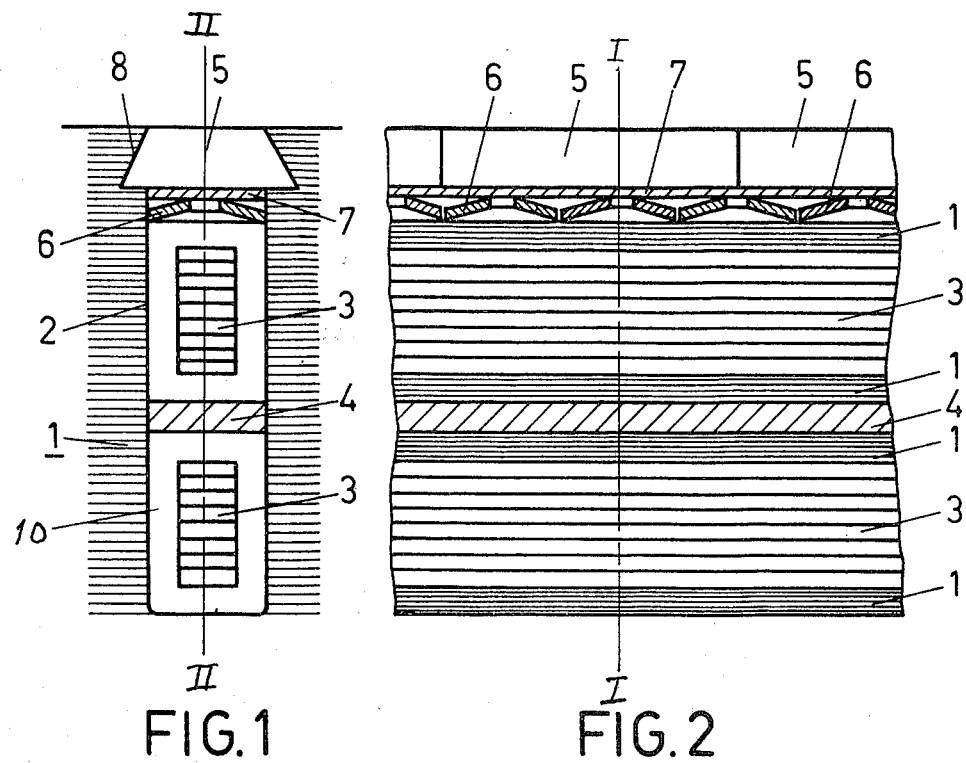
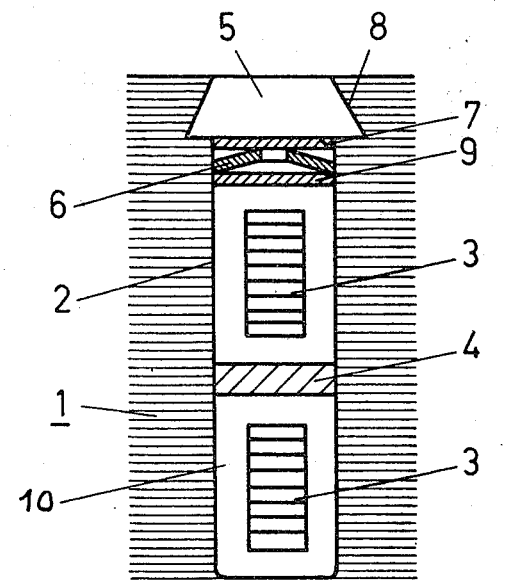

WINDING SLOT CLOSURE FOR ROTARY ELECTRIC MACHINES

The present invention relates to an improvement in a winding slot closure for a rotary electrical machine of the general type wherein the conductor winding installed in the slot is held firmly against movement by means including a wedge-shaped slot key.

The winding components of a rotary electrical machine are inserted into slots formed in a laminated stack of iron sheets and are held firmly in place within the slots by various known means against counter influences attributable to mechanical and electromagnetic forces. The winding slots are usually provided with a groove in the form of a dove-tail, or are shaped conically toward the inner periphery of the laminated stack. Following placement of the conductor windings in the slots, wedge keys having a complementary configuration are then slid into place along the slot in an axial direction and with the faces of the keys extending radially in known manner, thus preventing the winding from leaving its position in the slots. Shims can be used to compensate for any radial play, and it is always desirable to attain a most uniform and stable wedging of the winding throughout the entire length of the slot.

Even though in machines being concurrently constructed the winding conductors are insulated with thermo-stable synthetic resins and are pressed firmly into the slots by means of slot keys made of insulating material, there still remains the possibility of a weakening of the wedging force on the conductors in the course of time. This is primarily due to the fact that surfaces of components placed within the slot which are not completely flat at the time of installation will ultimately come to fit snugly against each other during operation of the machine, as occurrence which is facilitated by deformations caused by thermal influences, thus resulting in an apparent shrinkage of the entire contents within the slot. The power outputs of modern machines are steadily being increased and consequently also increasing are the currents and electromagnetic forces with the result that in the event there is a weakening of the compression forces on the components within the slot these components will be subjected to vibrational forces which could lead to mechanical damage to the conductor insulation and which would then lead to ground leakage, and ultimately to electrical failure of the machine.

For these reasons, various but very similar solutions have been proposed, for example, by placing specially constructed components under the slot keys or between the insulated conductors in the slot, these components being made of synthetic resin materials and which are electrically insulative. In this connection reference is made to Swiss Pat. Nos. 393,505 and 433,494.

The objective of the present invention is to provide an improved structural arrangement for keeping all components within the slots under a uniform and lasting compressive force, the improved construction featuring spring means inserted in the slot between the slot key and the conductor winding thereunder, the springs being made of an electrically insulative material, e.g. a fiber glass-reinforced synthetic resin, which can be manufactured in a simple and economic manner and which can be inserted in a row along the full length of the slot without the necessity for use of any special tools. The novel spring components will also make possible a most uniform load transmission throughout the entire length of the slot, even under circumstances where fully uniform installation conditions cannot be met, for example, in the case of a roebel bar geometry for the conductors. The spring components should be able to apply the necessary spring forces over a very short travel path, such as for example from 1 to 2 mm and will aid in the avoidance of strata separations. The spring component should also be able to compensate in a uniform manner any relative movements between the surface of the insulated conductor and the spring which may occur during heat-up of the machine, even at high contact pressures and high coefficients of friction, thus preventing any local damage to the insulation on the conductors. All of these objectives are attained by utilizing individual disk springs which are arranged in a row, as previously explained, in in the slot throughout its entire length between the winding conductors and the key which closes off the entrance to the slot. The springs can be installed individually or all together by fastening such as by glueing them individually in a row by means of an adhesive onto an intermediate strip of insulation material, during installation of the slot keys which are preferably sectionalized into short lengths.

It is particularly advantageous to utilize spring elements having a ring-shaped configuration, preferably in the form of a truncated cone and which are made from a glass fiber-reinforced synthetic resin material, this particular configuration having an inherently great spring force and making possible a more efficient alignment of individual springs even in the case where there is a shrinkage of the components within the slot during operation of the machine and which is not uniform over the entire length of the slot. The annular design of the disk springs also makes it possible to adjust the size of the individual springs in accordance with the width of the conductor slot.

A preferred embodiment of the invention will now be described in detail and is illustrated in the accompanying drawings wherein:

FIG. 1 is a cross-sectional view of a conductor slot portion of a laminated structural part of a rotary electrical machine taken on line I — I of FIG. 2 showing the slot conductors, the slot key closing off the entrance end to the slot and the spring insert for applyng a radial pressure to the slot conductor assembly;

FIG. 2 is a view in longitudinal section taken on line II — II of FIG. 1; and

FIG. 3 is a view similar to FIG. 1 but modified to include spaced strip inserts in the slot between which the springs are placed.

With reference now to FIGS. 1 and 2, numeral 1 designates a slot portion of a laminated structural part of a rotary electrical machine, the laminations consisting of a pack of iron sheet metals as is customary in machines of this type. The conductor slots are punched out of the lamination pack in the longitudinal direction of the machine and one such slot is shown at 2. The conductor winding inserted into the slot can take various forms and in the one illustrated, the winding comprises two multi-conductor units 3 with wrapped insulation 10 and separated from one another in the slot by means of a flat strip 4 of insulating material. The end of slot 2 i.e. at the inner periphery of the lamination pack of the machine, is closed off by means of a row of short-length wedgeshaped slot keys 5. If desired, a flat strip 7 of insulating material having a width equal to that of the slot 2 can be located beneath the base of the slot key, and a row of individual disc springs 6, as shown in FIG. 2 is placed between the end face of the insulated conductor winding 3 and the insulator strip 7, the springs being held under compression and hence serving to hold the slot keys 5 tightly in place against the dove-tail recess into which the short length slot keys 5 are slid into position, and to also exert pressure against winding 3 so that the lower end thereof is pressed firmly against the bottom of the slot.

As illustrated, the springs 6 are preferably annular and have the configuration of a truncated cone and are preferably made from a glass fiber-reinforced synthetic resin material.

The annular configuration for the springs makes it possible to select the size of the springs in accordance with the width of the slot. The dimensions are preferably selected in such manner that the outer diameter D of the annular spring is approximately equal to the width of the slot, and with the central opening in the spring having a maximum diameter of 0.3 D. The thickness of the spring, and the slope of the truncated cone depends upon the amount of spring force desired, and also on the type of material used for its manufacture, but the thickness ranges preferably from 2 to 4 mm, for a spring travel of from 1 to 2 mm, to give an example.

The embodiment depicted in FIG. 3 is essentially like that of FIGS. 1 and 2, the only difference being that another insulation strip 9 is located intermediate the springs 6 and the end face of the insulated winding 3.

One mode of installing the springs and wedges is to start at the middle of the slot by inserting one spring in the slot, pressing it downwardly to flatten it and then sliding one of the slot keys 5 which has a length of only a few centimeters over it, the insulator strip 7, if used, being of the same length as the slot key and being adhered to its under face. This procedure is repeated until the slot is wedged throughout its entire length.

Another mode of installing the springs and wedges is to glue all of the springs 6 for the slot in a row by means of a suitable adhesive such as silicon rubber thus making it possible to insert all of the springs of a slot into place at one time, and it is immaterial whether the springs rest directly upon the winding as in FIG. 2, or upon an intermediate insulator strip 9, as in FIG. 3. The individual short-length slot keys 5 can then be inserted one after the other into the dovetailed recesses 8 of the slot.

The use of the individually acting springs in accordance with the invention makes it possible to produce, in a simple manner a conductor slot closure which will contribute to the improvement of the operational safety and service life of the rotary electrical machine.

We claim:

1. In a rotary electrical machine comprising a laminated stack of iron sheets in which slots are provided and in which the winding conductors are inserted and the entrance to the slots are then closed by insertion of slot keys along complementary configured surfaces of the slots, the improvement wherein a row of individually acting disc springs made from an electrically insulative material are inserted in each slot between said slot key and the winding conductors, each of said disc springs serving to apply its own pressure to the slot key and to maintain the winding conductors under a compressive force.

2. A rotary electrical machine as defined in claim 1 wherein said individually acting disc springs have a truncated cone configuration.

3. A rotary electrical machine as defined in claim 2 wherein the diameter D of said truncated conical springs is equal to the width of the slot and the central opening therein has a maximum diameter of 0.3 D.

4. A rotary electrical machine as defined in claim 1 and which includes a strip of insulation material between said winding conductors and said individually acting disc springs which have a truncated cone configuration and are glued to said strip of insulation material to form a row extending longitudinally of the slot.

* * * * *